(12) United States Patent
Mizutani

(10) Patent No.: US 9,999,925 B2
(45) Date of Patent: Jun. 19, 2018

(54) THREE DIMENSIONAL PRINTER

(71) Applicant: Sodick Co., Ltd., Kanagawa (JP)

(72) Inventor: Wataru Mizutani, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 296 days.

(21) Appl. No.: 14/919,067

(22) Filed: Oct. 21, 2015

(65) Prior Publication Data

US 2016/0144429 A1    May 26, 2016

(30) Foreign Application Priority Data

Nov. 21, 2014    (JP) ................... 2014-236803

(51) Int. Cl.
| | |
|---|---|
| B22F 3/105 | (2006.01) |
| B33Y 30/00 | (2015.01) |
| B33Y 50/02 | (2015.01) |
| B22F 3/10 | (2006.01) |
| B22F 3/24 | (2006.01) |

(52) U.S. Cl.
CPC .......... B22F 3/1055 (2013.01); *B22F 3/1007* (2013.01); *B22F 3/24* (2013.01); *B22F 2003/1057* (2013.01); *B22F 2003/247* (2013.01); *B33Y 30/00* (2014.12); *B33Y 50/02* (2014.12); *Y02P 10/295* (2015.11)

(58) Field of Classification Search
CPC ... B22F 3/1055; B22F 2003/1056–2003/1059; B33Y 30/00; B33Y 50/00–50/02; B33Y 40/00
See application file for complete search history.

(56) References Cited

U.S. PATENT DOCUMENTS

| | | | |
|---|---|---|---|
| 7,754,135 B2* | 7/2010 | Abe .......... | B22F 3/1055 264/161 |
| 2015/0246414 A1* | 9/2015 | Hess .......... | B22F 3/1055 219/76.14 |

(Continued)

FOREIGN PATENT DOCUMENTS

JP    2007-100199 A    4/2007

OTHER PUBLICATIONS

CNCRouterSource (https://web.archive.org/web/20091129235542/http://www.cncroutersource.com/stepper-vs-servo.html).*

(Continued)

*Primary Examiner* — Jason L Lazorcik
(74) *Attorney, Agent, or Firm* — Maier & Maier, PLLC

(57) ABSTRACT

Provided is a lamination molding apparatus which can prevent the recoater head from being damaged when the recoater head clashes with an obstacle. Provided is a lamination molding apparatus including: a recoater head to form a material powder layer by moving in a chamber while supplying a material powder on a molding region and planarizing the material powder; wherein the recoater head is configured so as to be capable of being moved by a recoater head driving mechanism; the recoater head driving mechanism includes: a servo motor to move the recoater head; an encoder to detect a movement amount of the recoater head; and a controlling apparatus to control the servo motor in accordance with a value detected by the encoder; and the controlling apparatus is configured to place the servo motor in a non-control state when clashing of the recoater head with an obstacle is detected.

5 Claims, 10 Drawing Sheets

(56) References Cited

U.S. PATENT DOCUMENTS

2016/0311025 A1* 10/2016 Kaneko ................ B22F 3/1055
2016/0339519 A1* 11/2016 Sargent ................ B22F 3/1055

OTHER PUBLICATIONS

Arduino support forum (htttps://forum.arduino.cc/index.php?topic=70183.0—thread dated between Aug. 22, 2011 and Aug. 23, 2011).*

* cited by examiner

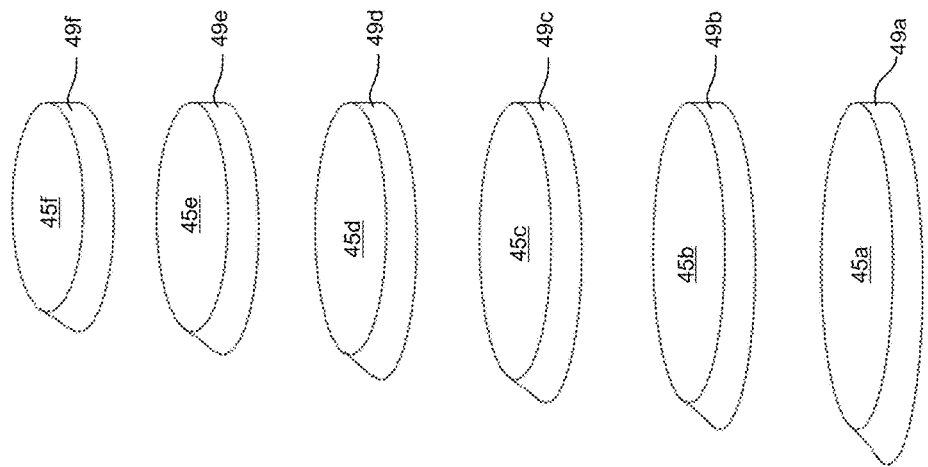
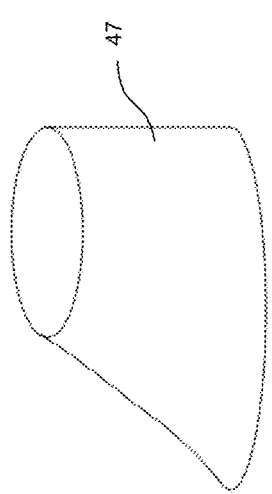
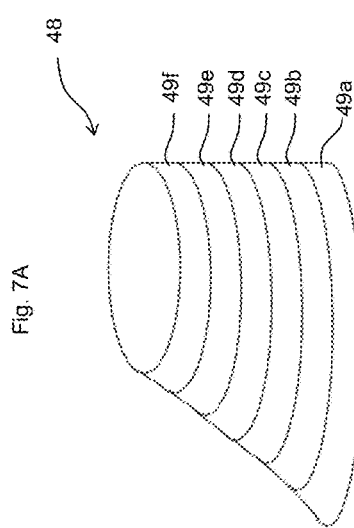
Fig. 7A
Fig. 7B
Fig. 7C

THREE DIMENSIONAL PRINTER

BACKGROUND OF THE INVENTION

Field of the Invention

The present invention relates to a lamination molding apparatus.

Background of the Invention

In a lamination molding method of metal using laser beam, a molding table capable of vertical movement is arranged in a molding room filled with nitrogen gas. Then, a very thin material powder layer is formed on the molding table. Subsequently, predetermined portions of this material powder layer are irradiated with the laser beam to sinter the material powder at the position of irradiation, thereby forming a sintered layer. These procedures are repeated to form a desired molded product. The material powder layer is formed by moving the recoater head, supplying the material powder onto the molding table while planarizing the material powder (Patent Literature 1).

Here, depending on the irradiation conditions of the laser beam, a bump is formed in the sintered layer. Since the gap between the recoater head and the sintered layer is extremely small, formation of the bump in the sintered layer can result in cases where the recoater head clashes with the bump.

In order to avoid termination of the lamination molding even when such clash occurs, Patent Literature 1 adopts a constitution in which the blade of the recoater head turns temporarily for evacuation when the blade clashes with the bump.

PRIOR ART DOCUMENTS

Patent Literature

[Patent Literature 1] JP 4792905B

SUMMARY OF INVENTION

Technical Problem

However, when the blade itself is configured to be movable, the structure of the recoater head becomes more complicated. Here, the height of the blade is adjusted strictly when installed on the recoater head, in order to stably form a thin material powder layer having a thickness of 300 µm or less. Since it is extremely difficult to install the blade, it is preferable that the blade is configured to so as not to move and to have a simple constitution as possible.

In addition, the blade needs to be designed to perform the avoiding operation by taking into account the degree of damage from the load applied to the blade. Whether the blade is damaged or not depends mainly on the moving speed of the recoater head (blade) or the material of the material powder (bulk density and hardness after sintering). Therefore, the design of the blade becomes more difficult. To stay on the safe side, the blade would undergo avoiding operation even with a low degree of load, resulting in frequent termination of recoating. Accordingly, recoating cannot be performed constantly and stably.

Here, a measure for detecting the load can be provided, and the blade can perform the avoiding operation in accordance with the load. However, when the blade performs the avoiding operation after detecting the load, there may be a case where the avoiding operation cannot be performed in time. In addition, since the avoiding operation of the blade is substantially controlled, the sequential molding operation run by the program needs to be suspended and restored by the controlling apparatus. This would elongate the molding period unnecessarily.

The present invention has been made by taking these circumstances into consideration. An object of the present invention is to provide a lamination molding apparatus which can prevent the recoater head from being damaged when the recoater head clashes with an obstacle, and to swiftly resume the forming process of the material powder layer.

Means to Solve the Problem

According to the present invention, a lamination molding apparatus comprising: a chamber covering a desired molding region and being filled with an inert gas having a desired concentration; a recoater head to form a material powder layer by moving in the chamber while supplying a material powder on the molding region and planarizing the material powder; and a laser beam emitter to irradiate a laser beam to a predetermined portion of the material powder layer, thereby sintering the material powder at a position of irradiation to form a sintered layer; wherein the recoater head is configured so as to be capable of being moved by a recoater head driving mechanism; the recoater head driving mechanism comprises: a servo motor to move the recoater head; an encoder to detect a movement amount of the recoater head; and a controlling apparatus to control the servo motor in accordance with a value detected by the encoder; and the controlling apparatus is configured to place the servo motor in a non-control state when clashing of the recoater head with an obstacle is detected, is provided.

Effect of the Invention

In the present invention, the greatest feature is that the servo motor is placed in a non-control state when it is detected that the recoater head may clash with an obstacle and may get damaged. By this operation, the torque is substantially lost instantly, and thus the recoater head would not be damaged even when the recoater head clashes with the obstacle. Then, since the recoater head would bound elastically by the obstacle, the recoater head would "run idly" in an opposite direction, losing speed mainly by the frictional resistance from the guide and the transfer mechanism and by the inertia of the motor, thereby being terminated in a condition of impact relaxation. Therefore, damage to the recoater head can be prevented, and the program can be resumed immediately, thereby allowing resuming of the forming process of the material powder layer promptly.

Hereinafter, various embodiments of the present invention will be provided. The embodiments provided below can be combined with each other.

Preferably, the controlling apparatus is configured to place the servo motor in a control state after prescribed criterion for resuming is satisfied.

Preferably, the lamination molding apparatus further comprises a spindle head configured to be capable of moving in the chamber; wherein the controlling apparatus is configured to re-start forming of the material powder layer after removing the obstacle by using a rotary cutting tool equipped onto the spindle head.

Preferably, the lamination molding apparatus further comprises an electric current detector to detect an electric current supplied to the servo motor; wherein the controlling apparatus places the servo motor in the non-control state when the electric current exceeds a prescribed electric current value and determines that the clashing has occurred.

Preferably, the controlling apparatus is configured so that when it is detected that the recoater head has clashed with an obstacle, the servo motor is placed in a non-control state in which the torque is lost, and the recoater head runs idly.

Preferably, the controlling apparatus is configured so that when the recoater head clashes with an obstacle during the forming of the material powder layer by moving the recoater head and the forming of the material powder layer is interrupted, the obstacle is removed by using a rotary cutting tool provided onto the spindle head, wherein the servo motor is placed in a control state before or after removing the obstacle, and then the moving of the recoater head is re-started so as to re-start the forming of the material powder layer.

BRIEF DESCRIPTION OF THE DRAWINGS

The above further objects, features and advantages of the present invention will become more apparent from the following detailed description taken in conjunction with the accompanying drawings, wherein:

FIG. 7A is a perspective view showing the molded product 47 having the desired profile.

FIG. 7B is a perspective view showing the model of the molded product of FIG. 7A.

FIG. 7C is a perspective view showing the model of FIG. 7B sliced by a horizontal plane at a predetermined unit height.

DESCRIPTION OF THE PREFERRED EMBODIMENTS

Hereinafter, the embodiments of the present invention will be described with reference to the drawings. Here, the characteristic matters shown in the embodiments can be combined with each other.

Figure 1:
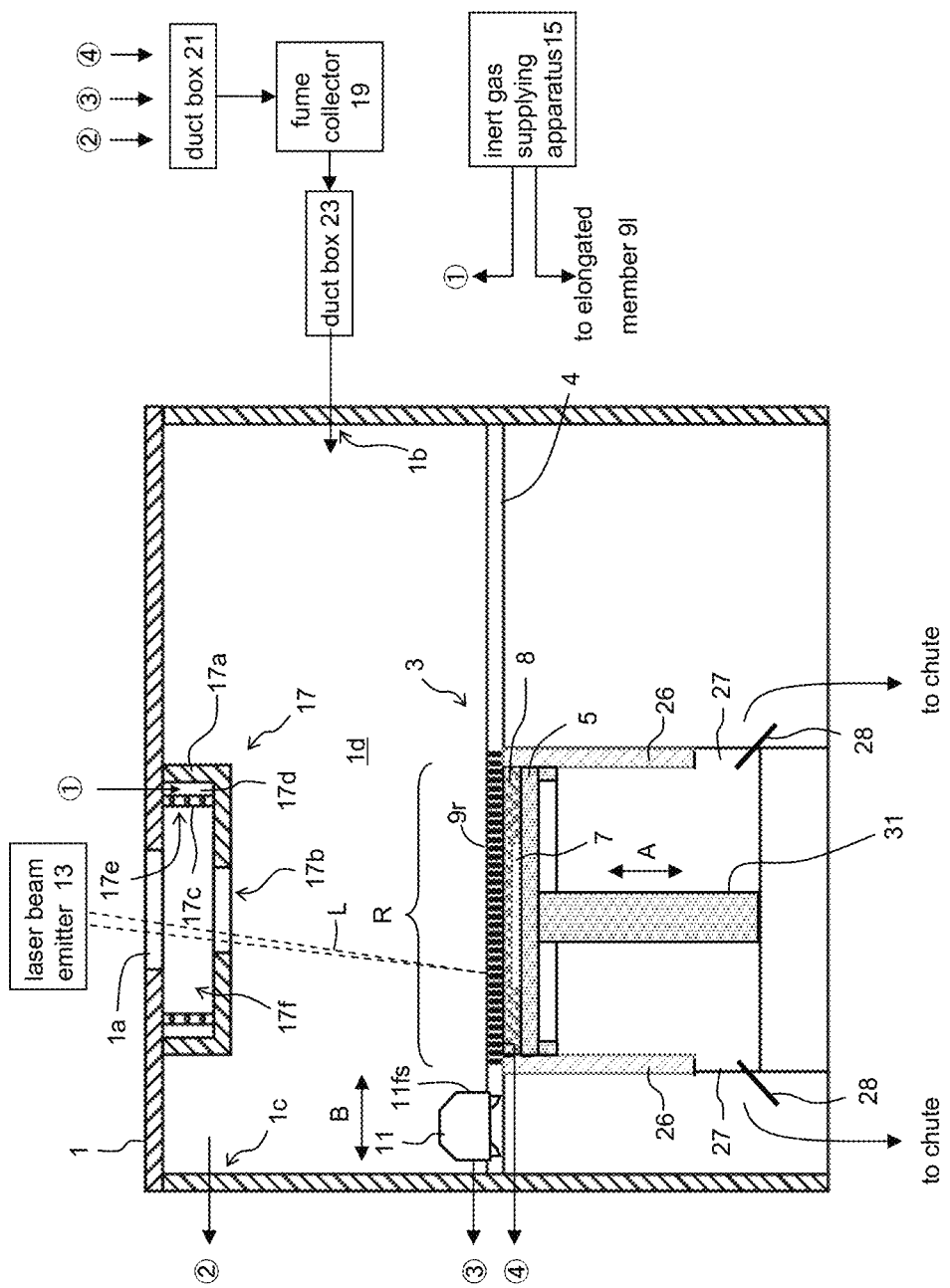
FIG. 1 is a rough structural diagram of the lamination molding apparatus according to an embodiment of the present invention.

As shown in FIG. 1, the lamination molding apparatus according to one embodiment of the present invention comprises a chamber 1 covering the desired molding region R and being filled with an inert gas having a desired concentration; a recoater head 11 moving in the chamber 1 and forming a material powder layer 8 by supplying and planarizing the material powder on the molding region R; a laser beam emitter 13 which irradiates predetermined portions of the material powder layer 8 with a laser beam L to sinter the material powder at the position of irradiation, thereby forming a sintered layer.

Inside the chamber 1, a powder layer forming apparatus 3 is provided. The powder layer forming apparatus 3 comprises a base stage 4 having the molding region R; a recoater head 11 provided on the base stage 4 and structured so as to be capable of moving in a horizontal uniaxial direction (direction shown by arrow B); and elongated members 9r, 9l provided on both sides of the molding region R along the moving direction of the recoater head 11. The molding region R is further provided with a molding table 5 capable of moving in a vertical direction (direction shown by arrow A in FIG. 1). Here, the molding table 5 is driven by a driving mechanism 31. When the lamination molding apparatus is used, a molding plate 7 is placed on the molding table 5, and the material powder layer 8 is formed on the molding table 5.

The powder retaining wall 26 is provided so as to surround the molding table 5, and the non-sintered material powder is retained in the powder retaining space surrounded by the powder retaining wall 26 and the molding table 5. In the lower side of the powder retaining wall 26, the powder discharging section 27 capable of discharging the material powder in the powder retaining space is provided. After completion of the lamination molding, the molding table 5 is descended so as to discharge the non-sintered material powder from the powder discharging section 27. The material powder discharged is guided to the chute by the chute guide 28, and then the material powder is retained in the bucket (both of them not shown) via the chute.

As shown in FIGS. 2 to 5, the recoater head 11 comprises a material holding section 11a, an upper surface opening section 11b provided at the top surface of the material holding section 11a, and a material discharging opening 11c provided at the bottom surface of the material holding section 11a, the material discharging opening 11c discharging the material powder in the material holding section 11a. The material discharging opening 11c has an elongated slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 8 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings along the moving direction (direction shown by arrow B) of the recoater head 11. One of the openings is used as the inert gas supplying opening, and the other opening is used as the inert gas discharging opening. Accordingly, a flow of inert gas can be made in the direction shown by the arrow C on the molding region R. Therefore, the fume generated in the molding region R can be easily discharged along this flow of the inert gas. Here, in the present specification, "inert gas" is a gas which substantially does not react with the material powder, and nitrogen gas, argon gas, and helium gas can be mentioned for example.

Figure 2:
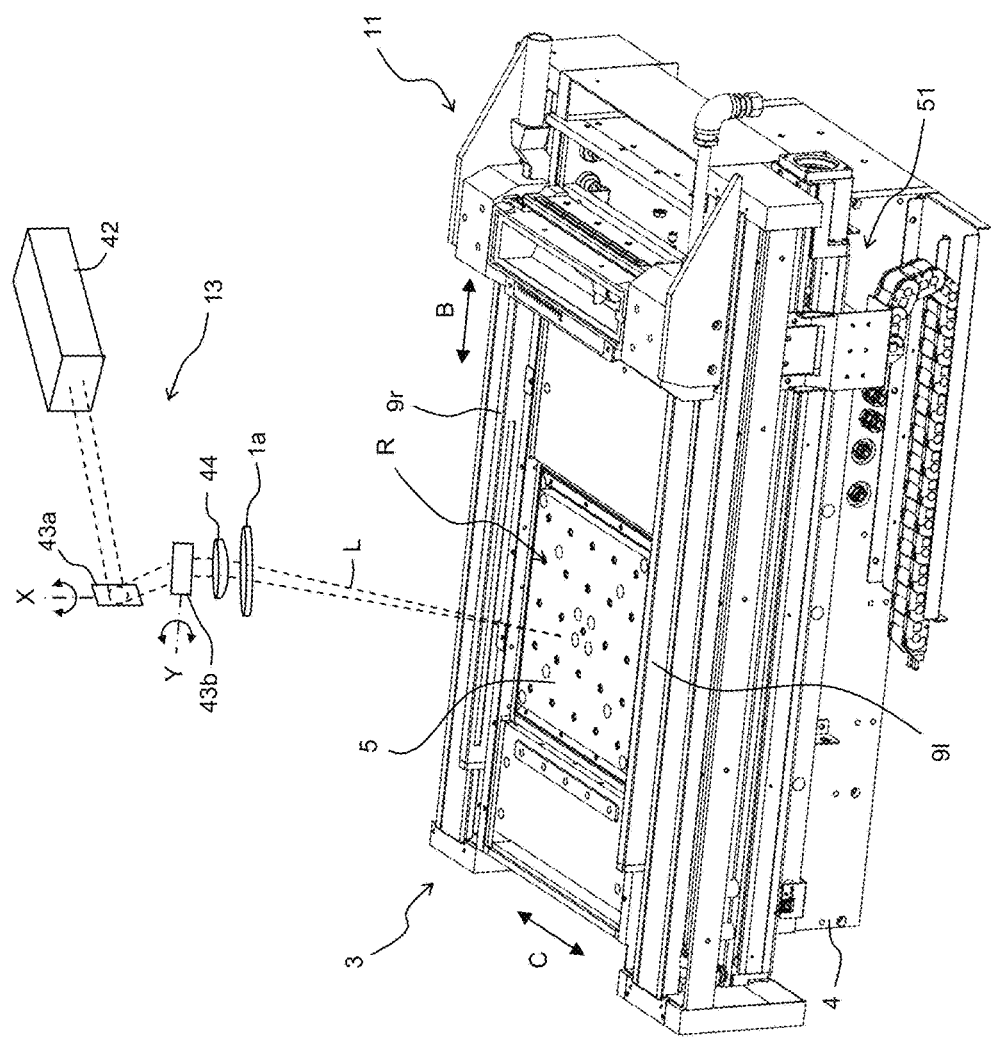
FIG. 2 is a perspective view of the powder layer forming apparatus 3 and the laser beam emitter 13.
Figure 3:
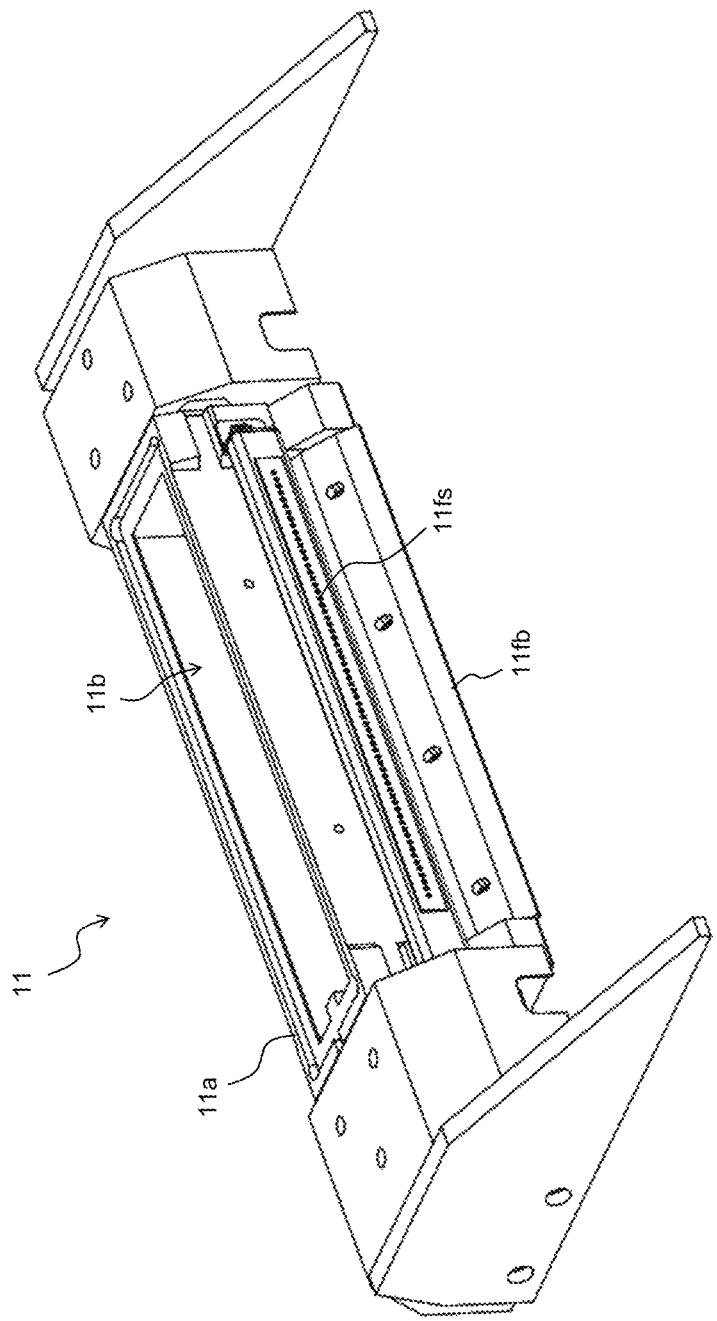
FIG. 3 is a perspective view of the recoater head 11.
Figure 4:
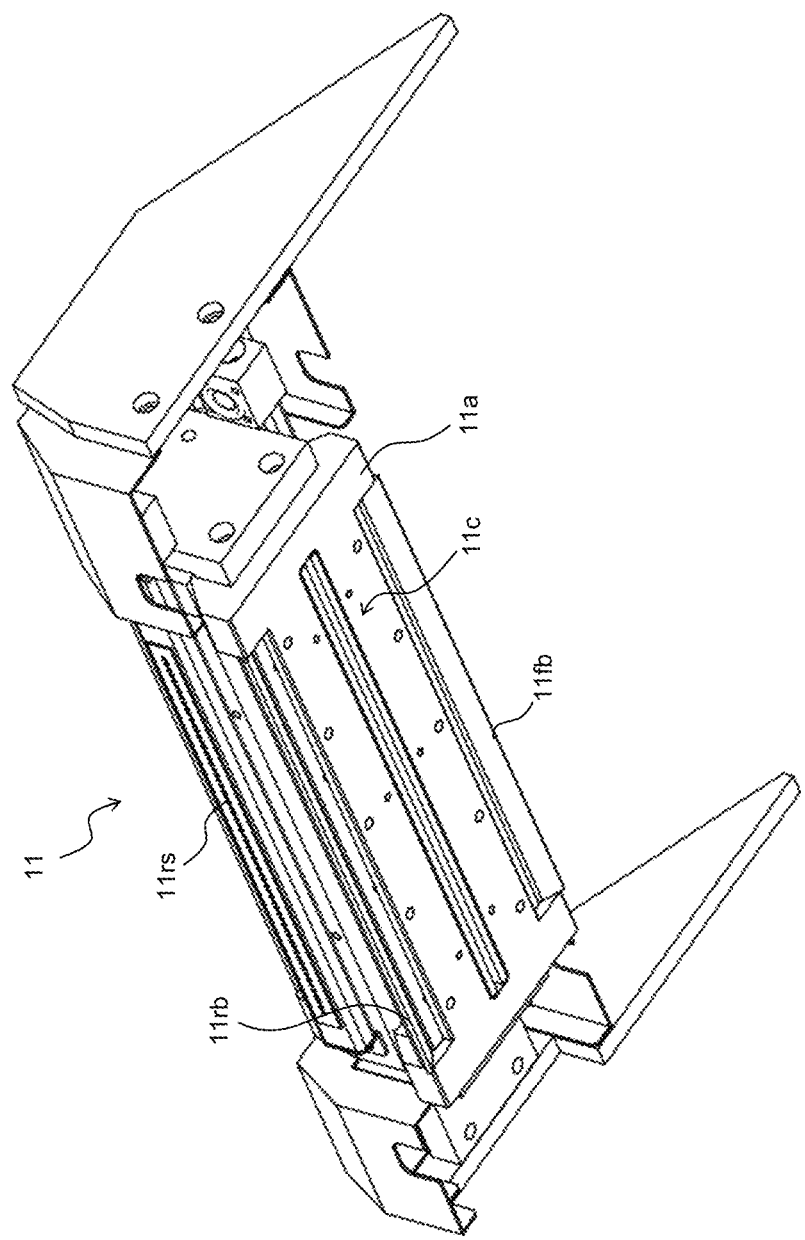
FIG. 4 is a perspective view of the recoater head 11 observed from another angle.

A laser beam emitter 13 is provided above the chamber 1. As shown in FIG. 2, the laser beam emitter 13 comprises a laser source 42 to emit the laser beam L, a pair of galvanometer scanners 43a and 43b to perform two dimensional scanning of the laser beam L emitted from the laser source 42, and a condensing lens 44 to condense the laser beam L. The galvanometer scanner (X-axis scanner) 43a scans the laser beam L in the direction shown by arrow B (X-axis direction), and the galvanometer scanner (Y-axis scanner) 43b scans the laser beam L in the direction shown by arrow C (Y-axis direction). Each of the scanners 43a and 43b is controlled of its rotation angle depending on the size of the rotation angle controlling signal. Accordingly, the position irradiated by the laser beam L can be moved to a desired position by altering the size of the rotation angle controlling signal being input to the scanners 43a and 43b. An example of the condensing lens 44 is fθ lens.

The laser beam L which passed through the condensing lens 44 further passes through the window 1a provided to the chamber 1. Then, the material powder layer 8 formed in the molding region R is irradiated with the laser beam L. The type of the laser beam L is not limited so long as it can sinter the material powder. For example, $CO_2$ laser, fiber laser, YAG laser and the like can be used. The window 1a is formed with a material capable of transmitting the laser beam L. For example, in a case where the laser beam L is fiber laser or YAG laser, the window 1a can be structured with a quartz glass.

On the upper surface of the chamber 1, the fume adhesion preventing section 17 is provided so as to cover the window 1a. The fume adhesion preventing section 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d is filled into a clean space 17f through the pores 17e. Then, the clean inert gas filled in the clean space 17f is discharged towards below the fume adhesion preventing section 17 through the opening 17b.

Figure 5:
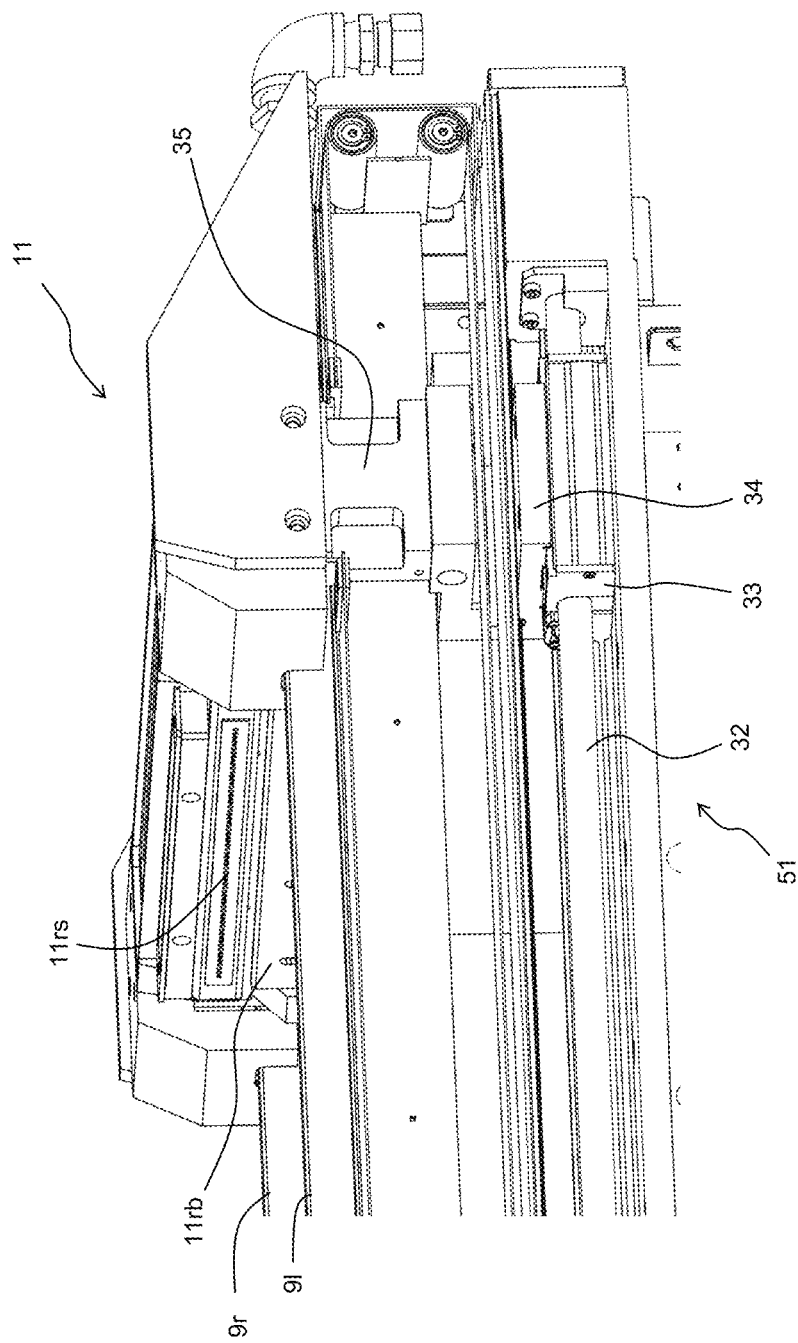
FIG. 5 is a perspective view of the constitution of the recoater head driving mechanism 51, obtained by taking out the constitution in the vicinity of the recoater head 11 of FIG. 2.
Figure 6:
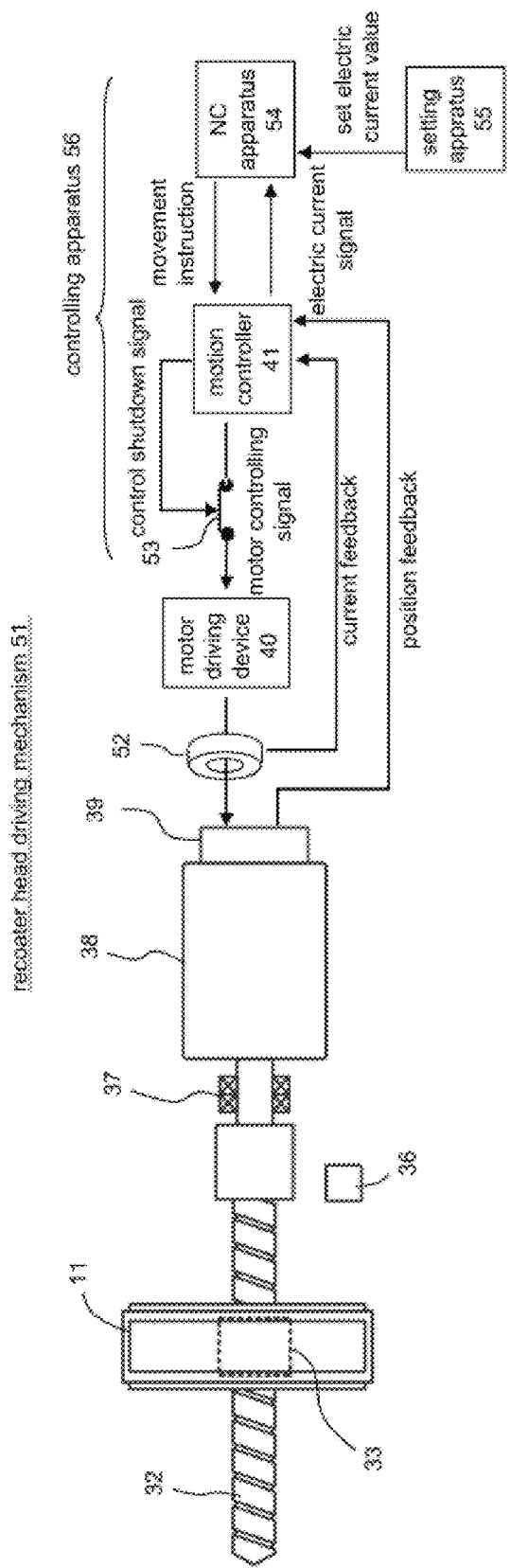
FIG. 6 is a structural diagram of the recoater head driving mechanism 51.
Figure 8:
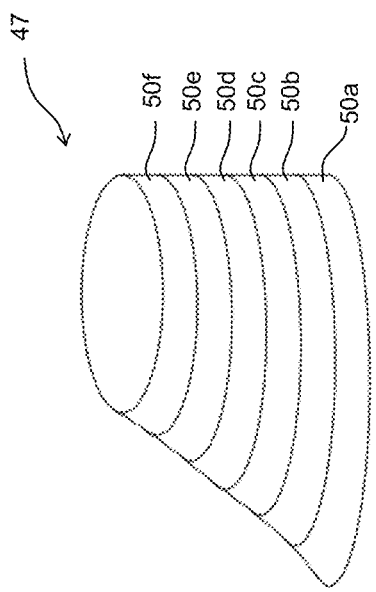
FIG. 8 is a perspective view showing the molded product 47 obtained by laminating the sintered layers 50.

The recoater head 11 is configured so as to be capable of being moved by the recoater head driving mechanism 51 shown in FIGS. 5 to 6. The recoater head 11 is fixed to the slide member 33 via the brackets 34 and 35, the slide member 33 being screwed to the ball screw 32. When the slide member 33 moves in accordance with the rotation of the ball screw 32, the recoater head 11 moves along together with the slide member 33. The ball screw 32 is rotatably supported by the bearing 37, and is rotated by the servo motor 38. The servo motor 38 is driven by the electric current supplied from the motor driving device 40. The motor driving device 40 is operated under the control of the motion controller 41, and supplies electric current to the servo motor 38 in accordance with the motor controlling signal from the motion controller 41. Accordingly, the rotation angle of the servo motor 38 is controlled by the motion controller 41 via the driving device 40. In addition, the motion controller 41 outputs the motor controlling signal to the motor driving device 40 in accordance with the movement instruction from the NC apparatus 54. The motion controller 41, relay 53, and NC apparatus 54 constitute the "controlling apparatus 56". The constitution of the controlling apparatus 56 is not limited to the one described here, and, for example, the relay 53 can be omitted or can be installed in the motion controller 41. In addition, the functions of the motion controller 41 and the NC apparatus 54 can be realized with one apparatus.

The rotation angle of the servo motor 38 is detected by the encoder 39. The rotation angle thus detected is feed-backed to the motion controller 41 (position feed-back). From the rotation angle of the servo motor 38, the position of the recoater head 11 can be obtained. In addition, the electric current supplied to the servo motor from the motor driving device 40 is detected by the electric current detector 52. The value of the electric current thus detected is feed-backed to the motion controller 41 (electric current feed-back). The motion controller 41 outputs the electric current signal based on the value of the feed-backed electric current to the NC apparatus 54. In the present invention, "servo motor" is a motor operatable under the feed-back from the encoder, and is not limited to the one rotatable as in the present embodiment, and thus a linear one can be used. In such case, a linear encoder is used as the encoder.

The motion controller 41 determines whether the feed-backed rotation angle of the servo motor 38 has reached the desired rotation angle. When the rotation angle is less than the desired rotation angle, the electric current supplied to the servo motor 38 is increased. Accordingly, when the recoater head 11 clashes with an obstacle while moving and the movement thereof is inhibited, the electric current supplied to the servo motor 38 is increased.

The NC apparatus continuously monitors the value of the electric current detected by the electric current detector 52. When the value exceeds a predetermined value of the electric current set via the setting apparatus 55, control shutdown instruction is immediately provided to the motion controller 41. The motion controller 41 outputs a control shutdown signal to the relay 53 in accordance with this instruction, thereby immediately shutting down the motor controlling signal provided to the motor driving device 40 by opening the relay 53.

When the motor controlling signal is shut down, the electric current supplied from the motor driving device 40 to the servo motor 38 is immediately terminated and the servo motor 38 is placed in a non-control state, and thus the ball screw 32 would be placed in a freely-rotatable state. Then, the recoater head 11 bounds elastically by the obstacle and "run idly" in an opposite direction, loosing speed mainly by the frictional resistance from the guide and the transfer mechanism and by the inertia of the motor, thereby being terminated in a condition of impact relaxation. Even in the state of such "idly running", the rotation angle of the servo motor 38 is continuously feed-backed, and thus the position of the recoater head 11 is grasped. Here, the recoater head 11 is not controlled so as to be moved to a certain position, nor is controlled so as to be moved at a certain moving speed. Accordingly, the recoater head 11 is in a non-control state. Here, the method for placing the servo motor 38 in the non-control state is not limited to the one shown in FIG. 6, and, for example, a relay can be provided in between the servo motor 38 and the motor driving device 40, thereby opening the relay to place the servo motor 38 in the non-control state; or the output of the motor controlling signal from the motion controller 41 can be terminated to place the servo motor 38 in the non-control state. In the latter case, external relay is not necessary.

The advantage of placing the servo motor 38 in the non-control state when the recoater head 11 clashes with an obstacle, rather than applying brake to the servo motor 38 or controlling the servo motor 38 to rotate the servo motor 38 in an opposite direction is, the time period required for removing the torque applied to the servo motor 38 can be shortened. By shortening this time period, the recoater head 11 can be prevented from getting damaged when the recoater head 11 clashes with an obstacle. According to the experiments conducted by the inventors, the recoater head 11 started moving in an opposite direction within shorter time period in the case where the servo motor 38 was placed in the non-control state, compared with the case where brake was applied to the servo motor 38 or the servo motor 38 was controlled to rotate in an opposite direction. In addition, the squeegee blades 11*fb* and 11*rb* were not damaged. From the above, it became apparent that the damage to the recoater head 11 can be suppressed to a minimum by placing the servo motor 38 in the non-control state when the recoater head 11 clashes with an obstacle, as in the present embodiment.

The servo motor 38 is resumed from the non-control state to the control state when the prescribed criteria for resuming are satisfied. As the criteria for resuming, arrival of the recoater head 11 running idly to the limit member 36, and elapse of prescribed time from the detection of the clash can be mentioned. Here, since the recoater head 11 does not always arrived at the limit member 36, it is preferable to use the elapse of time as the criterion. As the specific method for resuming the servo motor 38 to the control state, setting of the relay 53 to close automatically after elapse of prescribed time or outputting a control signal to close the relay 53 from the motion controller 41 after elapse of prescribed time can be mentioned. In addition, regarding a constitution without the relay, the NC apparatus 54 starts to output the movement instruction to the motion controller 41, and then the motion controller 41 starts to output the motor controlling signal in accordance with the instruction, thereby resuming the servo motor 38 to the control state.

In the chamber 1, a spindle head (not shown) configured so as to be equipped with a rotary cutting tool such as an endmill and to rotate such tool is provided. Here, the spindle head is arranged so as to be capable of moving in a three-dimensional direction. The NC apparatus 54 can perform the process of removing the obstacle by using the rotary cutting tool provided onto the spindle head before re-starting the material powder layer forming process. By performing such process, the recoater head 11 can be prevented from re-clashing with the obstacle. Since the obstacle is usually a bump formed in the sintered layer, the bump can be removed by the rotary cutting tool. Here, instead of removing only the bump, the entire surface of the sintered layer can be subjected to cutting. In such case, there is an advantage in that the obstacle can be removed without specifying the position of the bump. Further, re-clashing with the obstacle can be prevented by descending the molding table 5 instead of performing the cutting. The timing for resuming the servo motor 38 from the non-control state to the control state can be before or after the process of removing the obstacle.

The NC apparatus 54 re-starts the material powder layer forming process after removing the obstacle, and then successively performs the lamination molding. Specifically, the NC apparatus 54 re-starts the output of the movement instruction from the point of time when the material powder layer forming process was interrupted, such interruption being caused by the clashing of the recoater head 11 with an obstacle. The NC apparatus 54 usually cannot execute the program from the middle of a process. Therefore, when the NC apparatus 54 is terminated due to error since the clashing with the obstacle is detected, the lamination molding needs to be performed from the start, or a program which starts from the point of time when the process was terminated needs to be made and executed, both of which are burdensome. On the contrary, the present embodiment need not to terminate the NC apparatus 54, and thus it is advantageous in that the process can be continued.

Next, the inert gas supplying system to supply the inert gas to the chamber 1 and the fume discharging system to discharge the fume from the chamber 1 are explained.

The inert gas supplying system to supply the inert gas into the chamber 1 is connected with an inert gas supplying apparatus 15 and a fume collector 19. The inert gas supplying apparatus 15 has a function to supply the inert gas, and is a gas cylinder of an inert gas for example. The fume collector 19 comprises duct boxes 21 and 23 provided at its upper stream side and its lower stream side, respectively. The gas (inert gas containing fume) discharged from the chamber 1 is sent to the fume collector 19 through the duct box 21. Then, fume is removed in the fume collector 19, and the cleaned inert gas is sent to the chamber 1 through the duct box 23. According to such constitution, the inert gas can be recycled.

As shown in FIG. 1, the inert gas supplying system is connected with the upper supplying opening 1*b* of the chamber 1, the inert gas supplying space 17*d* of the fume adhesion preventing section 17, and the elongated member 9*l*. The inert gas is supplied into the molding space 1*d* of the chamber 1 through the upper supplying opening 1*b*. The inert gas supplied into the elongated member 9*l* is discharged onto the molding region R through the opening.

In the present embodiment, the inert gas from the fume collector 19 is sent to the upper supplying opening 1*b*, and the inert gas from the inert gas supplying apparatus 15 is supplied to the inert gas supplying space 17*d* and to the elongated member 9*l*. Although there is a possibility that the inert gas from the fume collector 19 contains residual fume, the constitution of the present embodiment does not permit the inert gas from the fume collector 19 be supplied into the space which requires especially high cleanliness (clean space 17*f* and the space at the periphery of the molding region R). Accordingly, the effect of the residual fume can be minimized.

As shown in FIG. 1, the fume discharging system to discharge the fume from the chamber 1 is connected with the upper discharging opening 1*c* of the chamber 1, the fume suction sections 11*fs* and 11*rs* of the recoater head 11, and the elongated member 9*r*. Since the inert gas containing the fume in the molding space 1*d* of the front chamber 1*f* is discharged through the upper discharging opening 1*c*, a flow of inert gas flowing from the upper supplying opening 1*b* towards the upper discharging opening 1*c* is formed in the molding space 1*d*. The fume suction sections 11*fs* and 11*rs* of the recoater head 11 can suction the fume generated in the molding region R when the recoater head 11 passes over the molding region R. Here, the inert gas containing the fume is discharged out of the chamber 1 through the opening of the elongated member 9*r*. The fume discharging system is connected with the fume collector 19 through the duct box 21, and the inert gas after removal of the fume by the fume collector 19 is recycled.

Next, the lamination molding method using the aforementioned lamination molding apparatus will be explained.

Here, a case where the molded product 47 having the three-dimensional profile as shown in FIG. 7A is formed by lamination molding is taken as an example for the explanation.

First, as shown in FIGS. 7B to 7C, a molded product 47 having the desired three-dimensional profile is molded using a computer, thereby obtaining a model 48 of the molded product. Then the model 48 of the molded product is sliced by a horizontal plane with a predetermined unit height, thereby forming sliced layers of 49a, 49b, . . . 49f. Subsequently, as shown in FIGS. 7 to 10, the material powder layer 8 is irradiated with the laser beam L so as to selectively sinter the material powder, thereby forming the sintered layers of 50a, 50b, . . . 50f having the profile corresponding to the sliced layers of 49a, 49b, . . . 49f respectively. The sintered layers are also fused with each other, thereby forming the molded product 47. The region surrounded by the outline profile of each of the sliced layers of 49a, 49b, . . . 49f is the region to be irradiated with the laser beam L, f 45a, 45b, . . . 45f (hereinafter referred to as irradiation region). The sliced layers, sintered layers, and irradiation region are also referred to as sliced layers 49, sintered layers 50, and irradiation region 45, respectively.

As described, the molded product 47 can be formed by repeating selective sintering of the material powder of the material powder layer 8 in the irradiation region 45. This is accomplished by irradiating the irradiation region 45 with the laser beam L. Here, the irradiation region 45 is surrounded by the outline profile of each of the sliced layers 49 of the model 48 of the molded product.

Next, the method for forming the sintered layers 50 will be explained in detail.

First, the height of the molding table 5 is adjusted to an adequate position while the molding plate 7 is mounted on the molding table 5. In such condition, the recoater head 11 having the material holding section 11a filled with the material powder is moved from the left side to the right side of the molding region R (in the direction shown by the arrow B in FIG. 1. Accordingly, the first layer of the material powder layer 8 is formed on the molding table 5.

Figure 9:
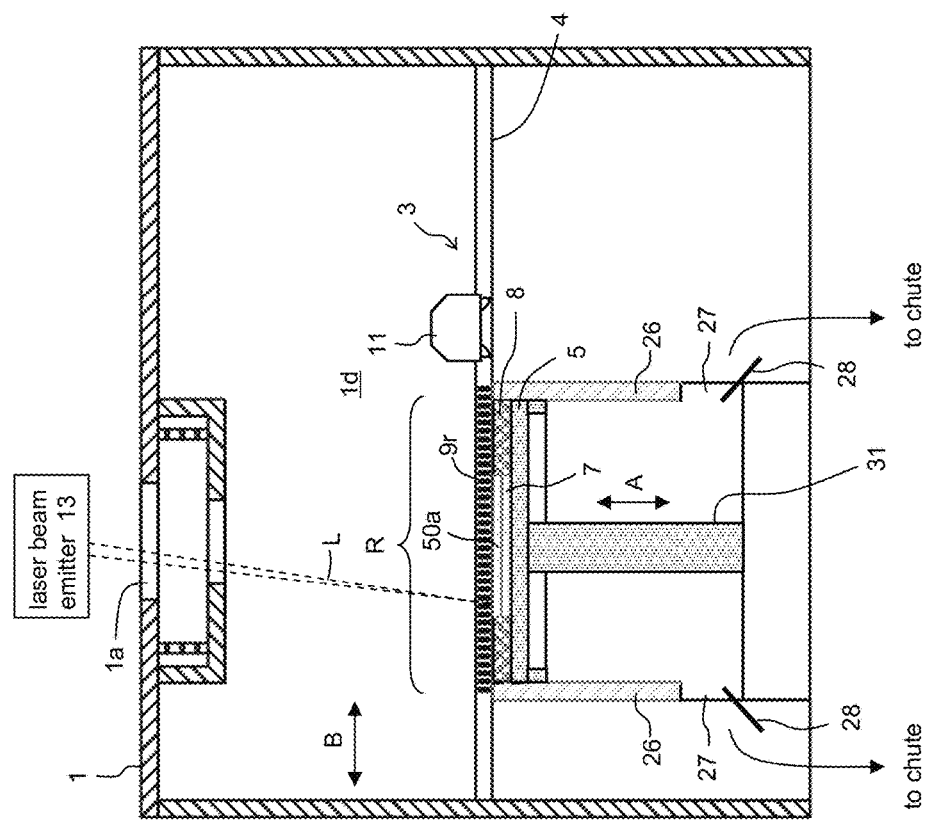
FIG. 9 is an explanatory drawing showing the lamination molding method which uses the lamination molding apparatus of FIG. 1.

Subsequently, a prescribed portion of the material powder layer 8 is irradiated with the laser beam L, thereby sintering the portion of the material powder layer 8 irradiated with the laser beam L. Accordingly, the first sintered layer 50a is obtained as shown in FIG. 9.

Next, the height of the molding table 5 is descended by the thickness of one layer of the material powder layer 8, followed by moving of the recoater head 11 from the right side to the left side of the molding region R. Accordingly, the second material powder layer 8 is formed so as to cover the sintered layer 50a.

Figure 10:
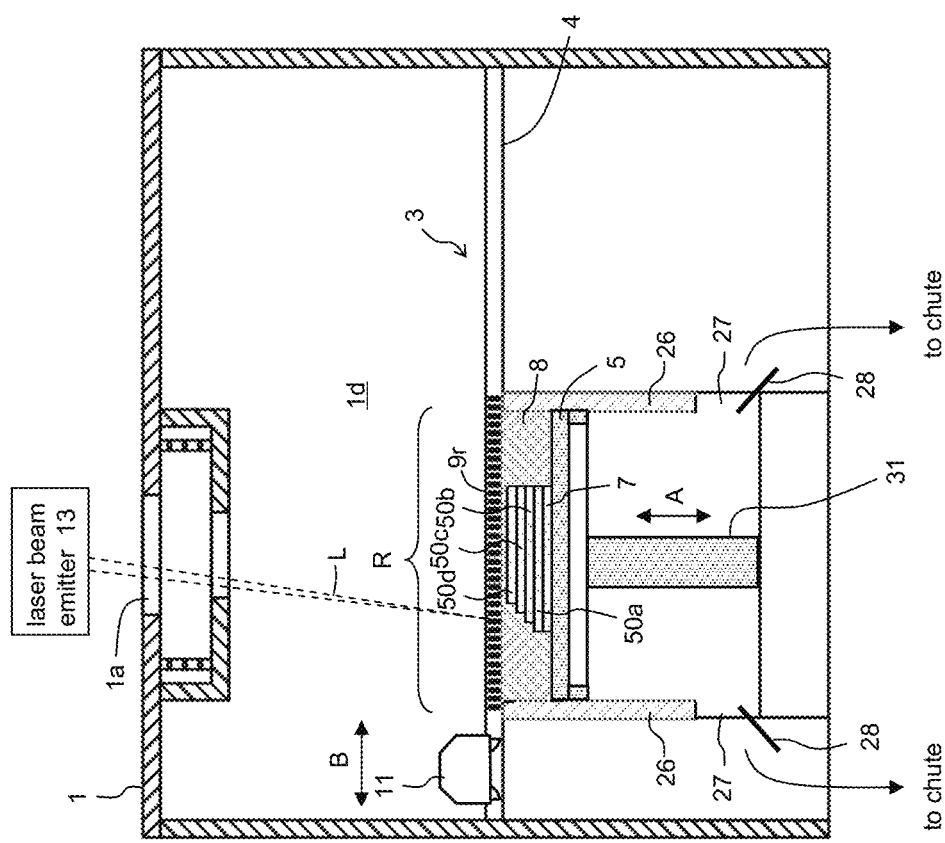
FIG. 10 is an explanatory drawing showing the lamination molding method which uses the lamination molding apparatus of FIG. 1.

Subsequently, in a similar manner as described, the prescribed portion of the material powder layer 8 is irradiated with the laser beam L, thereby sintering the portion of the material powder layer 8 irradiated with the laser beam. Accordingly, the second sintered layer 50b is obtained as shown in FIG. 10.

By repeating the afore-mentioned procedures, the third sintered layer 50c, the fourth sintered layer 50d, and the sintered layers thereafter are formed. The neighboring sintered layers are firmly fixed with each other.

Depending on the irradiation conditions of the laser beam L, bump would be formed in the sintered layer, and then there may be a case where the squeegee blades 11fb, 11rb of the recoater head 11 clash with the bump in the sintered layer. In the present embodiment, when such clash is detected, the servo motor 38 is immediately placed in the non-control state, and thus the recoater head 11 moves in an opposite direction by the bounding force applied when the recoater head 11 clashes with the bump. After elapse of prescribed time period, the servo motor 38 is resumed to a control state, and the recoater head 11 is moved to the position for starting the powder layer forming process. Subsequently, the rotary cutting tool equipped onto the spindle head is used to perform cutting to the entire surface of the sintered layer, thereby removing the bump. Then, NC apparatus 54 re-starts the output of the movement instruction to re-start the process from the beginning of the material powder layer forming process in which the process was interrupted by the clashing of the recoater head 11 with the bump. Accordingly, the lamination molding is continued. As described, in the present embodiment, no error would occur even when the recoater head 11 clashes with the bump in the sintered layer, allowing successive lamination molding. In addition, by placing the servo motor 38 in the non-control state, the torque of the servo motor 38 can be removed immediately, and thus the squeegee blades 11fb, 11rb can be prevented from being damaged. Therefore, generation of unevenness in the material powder layer 8 due to the damage in the squeegee blades 11fb, 11rb can be prevented. In addition, the burden to replace the squeegee blades 11fb, 11rb can be omitted.

After completion of the lamination molding, the non-sintered material powders are discharged via the powder discharging section 27, to give the molded product.

EXPLANATION OF SYMBOLS

1: chamber
3: powder layer forming apparatus
5: molding table
8: material powder layer
11: recoater head
13: laser beam emitter
17: fume adhesion preventing section
26: powder retaining wall
27: powder discharging section
28: chute guide
31: driving mechanism
32: ball screw
33: slide member
34,35: bracket
36: limit member
37: bearing
38: servo motor
39: encoder
40: motor driving device
41: motion controller
42: laser source
43a, 43b: galvanometer scanner
44: condensing lens
45: irradiation region
47: molded product
48: model of molded product
49: sliced layer
50: sintered layer
51: recoater head driving mechanism
52: electric current detector
53: relay
54: NC apparatus
55: setting apparatus
56: controlling apparatus
L: laser beam Although various exemplary embodiments have been shown and described, the invention is not limited to the embodiments shown. Therefore, the scope of the invention is intended to be limited solely by the scope of the claims that follow.

What is claimed is:

1. A lamination molding apparatus comprising:
   a chamber covering a desired molding region and being filled with an inert gas having a desired concentration;
   a recoater head to form a material powder layer by moving in the chamber while supplying a material powder on the molding region and planarizing the material powder; and
   a laser beam emitter to irradiate a laser beam to a predetermined portion of the material powder layer, thereby sintering the material powder at a position of irradiation to form a sintered layer; wherein
   the recoater head is configured so as to be capable of being moved by a recoater head driving mechanism;
   the recoater head driving mechanism comprises: a servo motor to move the recoater head; an encoder to detect a movement amount of the recoater head; and a controlling apparatus to control the servo motor in accordance with a value detected by the encoder; and
   the controlling apparatus is configured to place the servo motor in a non-control state, thereby placing the recoater head in a non-control state, when clashing of the recoater head with an obstacle is detected.

2. The lamination molding apparatus of claim 1, wherein the controlling apparatus is configured to place the servo motor in a control state after prescribed criterion for resuming is satisfied.

3. The lamination molding apparatus of claim 1, further comprising:
   a spindle head configured to be capable of moving in the chamber; wherein
   the controlling apparatus is configured to re-start forming of the material powder layer after removing the obstacle by using a rotary cutting tool equipped onto the spindle head.

4. The lamination molding apparatus of claim 1, further comprising:
   an electric current detector to detect an electric current supplied to the servo motor; wherein
   the controlling apparatus places the servo motor in the non-control state when the electric current exceeds a prescribed electric current value and determines that the clashing has occurred.

5. The lamination molding apparatus of claim 1, wherein in the non-control state, the recoater head is not controlled so as to be moved to a certain position, nor controlled to be moved at a certain speed.

* * * * *